(12) United States Patent
Lee

(10) Patent No.: US 12,497,217 B2
(45) Date of Patent: Dec. 16, 2025

(54) PILL CONTAINER

(71) Applicant: E-LINK PLASTIC & METAL INDUSTRIAL CO., LTD., New Taipei (TW)

(72) Inventor: Cheng-Hua Lee, New Taipei (TW)

(73) Assignee: E-LINK PLASTIC & METAL INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 18/617,887

(22) Filed: Mar. 27, 2024

(65) Prior Publication Data

US 2025/0304334 A1    Oct. 2, 2025

(51) Int. Cl.
| | |
|---|---|
| B65D 43/16 | (2006.01) |
| B65D 1/36 | (2006.01) |
| B65D 43/22 | (2006.01) |
| E05F 1/12 | (2006.01) |
| E05C 3/14 | (2006.01) |

(52) U.S. Cl.
CPC ............. B65D 43/164 (2013.01); B65D 1/36 (2013.01); B65D 43/22 (2013.01); E05F 1/12 (2013.01); B65D 2251/1008 (2013.01); B65D 2251/1033 (2013.01); B65D 2543/00194 (2013.01); E05C 3/14 (2013.01)

(58) Field of Classification Search
CPC .... B65D 43/164; B65D 43/168; B65D 43/16; B65D 43/163; B65D 43/166; B65D 43/18; B65D 2251/10

USPC ........................................... 206/538; 220/810
See application file for complete search history.

(56) References Cited

U.S. PATENT DOCUMENTS

| | | | |
|---|---|---|---|
| 5,620,107 A * | 4/1997 | Takeuchi ........... | B65D 47/0809 220/827 |
| 10,420,703 B1 | 9/2019 | Lee | |
| 2005/0023284 A1* | 2/2005 | Heiberg ............... | B65F 1/1646 220/827 |
| 2005/0218105 A1* | 10/2005 | Arai ...................... | B65D 43/22 220/829 |
| 2014/0048992 A1* | 2/2014 | Leung .................. | B65D 43/166 267/164 |
| 2021/0283018 A1* | 9/2021 | Guo ...................... | A61J 7/0084 |
| 2021/0394974 A1* | 12/2021 | Miura .................. | A47K 10/421 |
| 2022/0153491 A1* | 5/2022 | Wang ........................ | A61J 1/03 |
| 2022/0388731 A1* | 12/2022 | Chen ..................... | B65D 43/169 |

* cited by examiner

Primary Examiner — Robert Poon
(74) Attorney, Agent, or Firm — Birch, Stewart, Kolasch & Birch, LLP

(57) ABSTRACT

A pill container has a body, at least one lid, and at least one elastic assembly. The body comprises a first wall, a second wall, and at least one compartment. The first wall and second wall are two opposite sides of the body. The compartment is located between the first wall and the second wall. The lid is pivotably mounted on the second wall of the body. The elastic assembly is located on the second wall, and has a flexural segment and a first protruding section. The first protruding section is located on the flexural segment and contacts the second wall. The first protruding section supports a space between the flexural segment of the elastic assembly and the body.

12 Claims, 7 Drawing Sheets

PILL CONTAINER

BACKGROUND OF THE INVENTION

1. Field of the Invention

The present invention relates to a pill container.

2. Description of the Prior Arts

A pill container is applied to hold pills, such as medicines or vitamins for a user to take pills regularly. A conventional pill container substantially has a single body or a combined body, and each of them must comprise at least one lid and at least one compartment for containing medicines. The body comprises a locking device. The locking device can control the opening and closing of the lid. When the locking device is unlocked, the lid can be opened, and the medicine can be taken out from the corresponding compartment.

U.S. Pat. No. 10,420,703 provides a pill container. In order to assist the lid in opening and to have a sufficient opening angle, an elastic assembly is provided at an end of the lid where the lid contacts the body. When the locking device is unlocked, the elastic assembly pushes the lid to open. However, since the elastic assembly is bent at a large angle when the lid is closed, it is easy for the elastic assembly to acquire elasticity fatigue when used for a long period of time, which eventually leads to insufficient opening angle of the lid.

To overcome the shortcomings, the present invention provides a pill container to mitigate or obviate the aforementioned problems.

SUMMARY OF THE INVENTION

The main objective of the present invention is to provide a pill container that prevents the elastic assembly of the pill container from bending at a large angle when the pill container is closed. Thus, the present invention prevents the elastic assembly from acquiring elasticity fatigue after the pill container is used from a long time.

The pill container has a body, at least one lid, and at least one elastic assembly.

The body comprises a first wall, a second wall, at least one compartment, and at least one locking button. The first wall is one side wall of the body. The second wall is opposite to the first wall. The at least one compartment is formed in the body and is located between the first wall and the second wall. The at least one locking button is mounted on the first wall and corresponds to the at least one compartment in number and position.

The at least one lid is pivotably mounted on the second wall of the body and corresponds to the at least one compartment in number and position. Each one of the at least one lid respectively and selectively closes the at least one compartment and can be embedded in the at least one locking button. Each one of the at least one lid comprises an inner surface facing the compartment.

The at least one elastic assembly is bonded to the second wall of the body and corresponds to the at least one compartment in number and position, and is respectively configured to push the lid open. Each one of the at least one elastic assembly comprises a first segment, a second segment, a flexural segment, and a first protruding section.

The first segment is bonded to the second wall of the body. The second segment corresponds to the first segment and abuts against the inner surface of the lid. The flexural segment is located between the first segment and the second segment and the flexural segment can be bent or straightened. The first protruding section is located on one side of the flexural segment and selectively contacts the second wall.

The advantage of the present invention over the conventional pill container is by adding a first protruding section and a second protruding section to the elastic assembly. The first protruding section supports a space between the flexural segment of the elastic assembly and the body so that the flexural segment can have more space to bend without presenting a folded corner due to direct contact with the second wall of the body. Therefore, the elastic assembly is less prone to elastic fatigue and can be used for a longer period of time, and allows the lid to remain open at a large angle.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
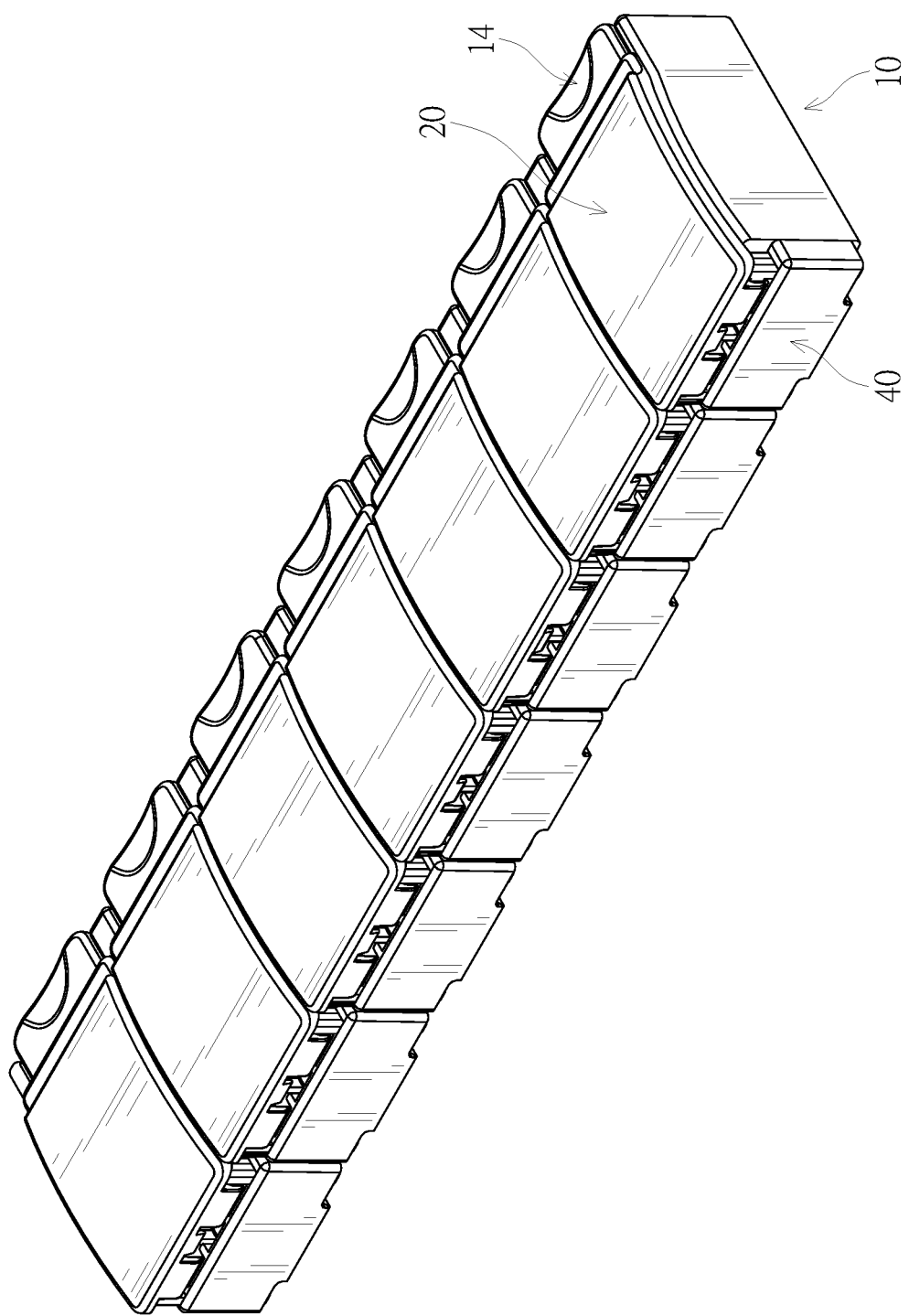
FIG. 1 is a perspective view of a pill container in accordance with the present invention.
Figure 2:
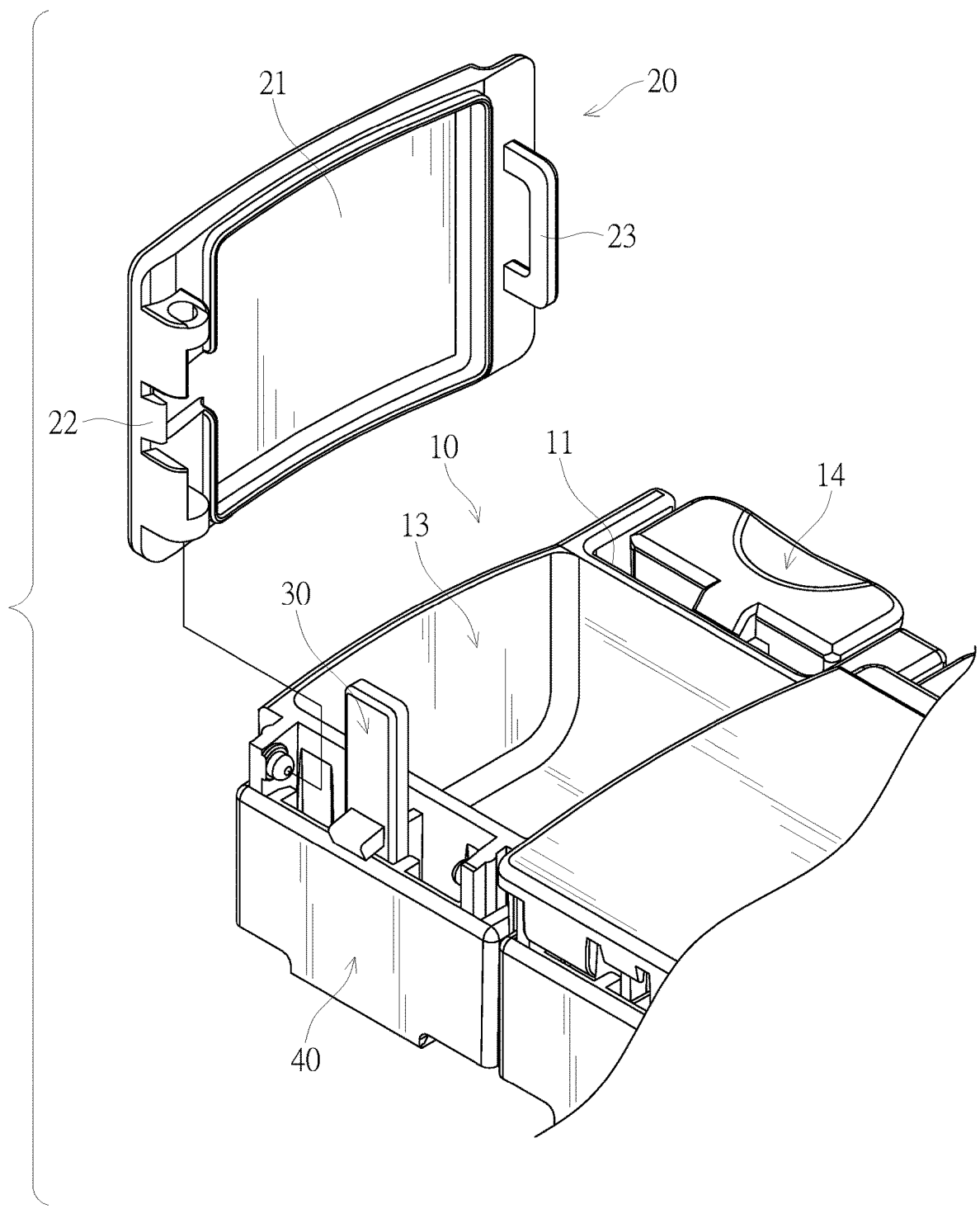
FIG. 2 is a partial exploded view of the pill container in FIG. 1.
Figure 3:
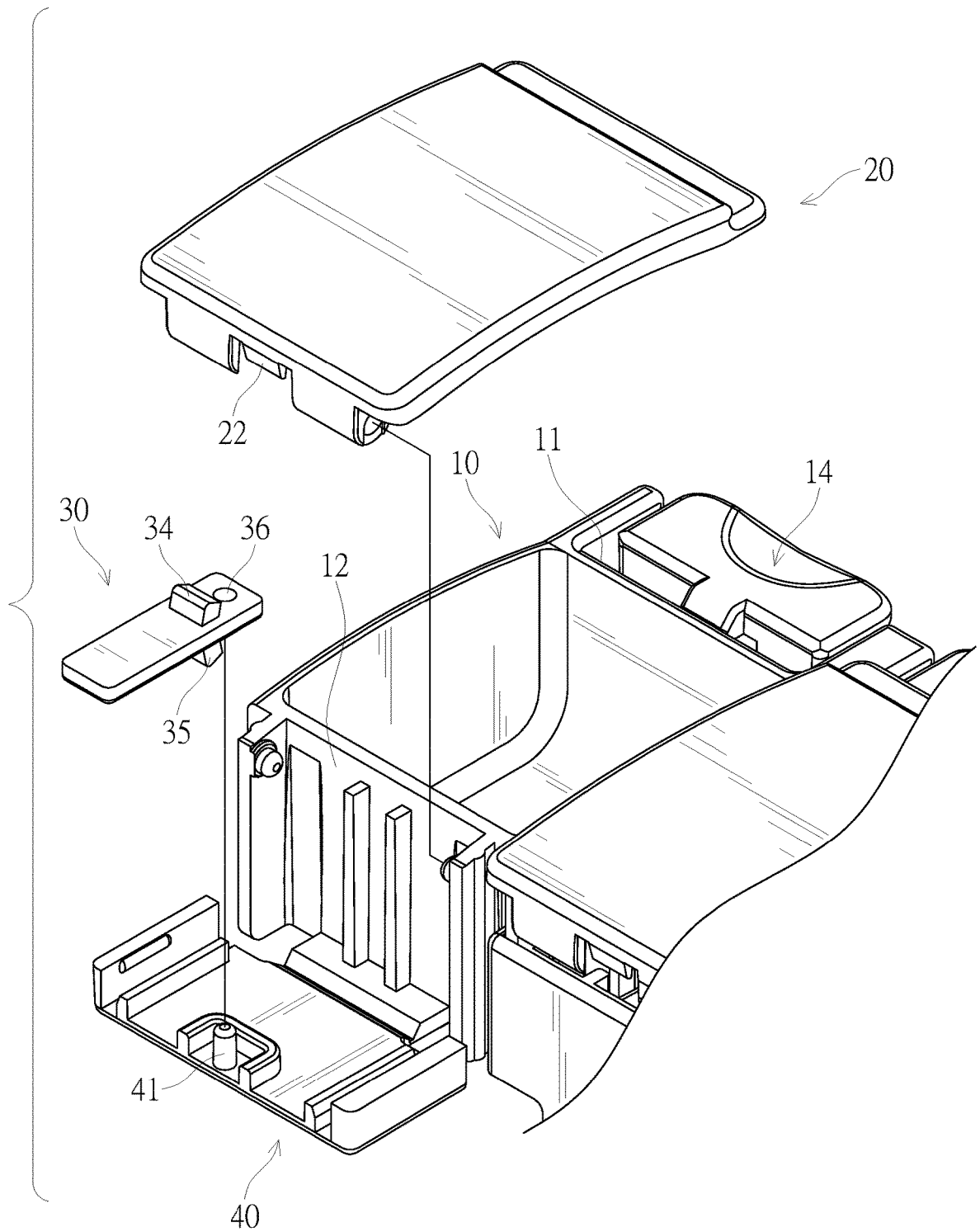
FIG. 3 is a partial exploded view of the pill container in FIG. 1.
Figure 4:
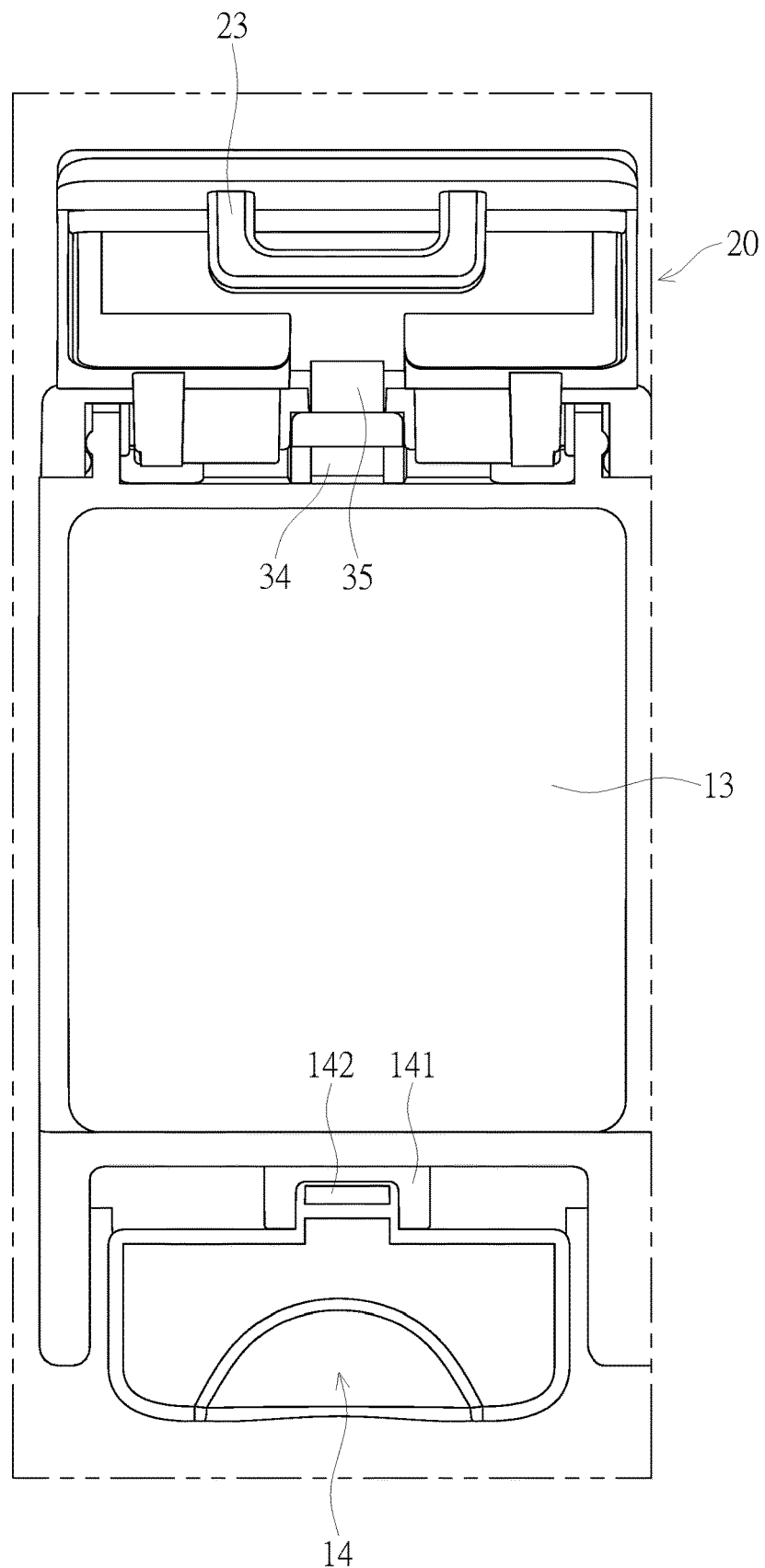
FIG. 4 is a top view of a lid of the pill container in FIG. 1, showing one lid being opened.

With reference to FIG. 1 to FIG. 3, the present invention provides a pill container. The pill container comprises a body 10, at least one lid 20, at least one elastic assembly 30, and at least one side cover 40. In another embodiment, the pill container may not comprise the side cover 40.

In this embodiment, the pill container comprises a body 10, multiple lids 20, multiple elastic assemblies 30 and multiple side covers 40. In another embodiment, the pill container can also comprise a body 10, a lid 20, an elastic assembly 30 and a side cover 40.

With reference to FIG. 4 to FIG. 7, in this embodiment, the body 10 comprises a first wall 11, a second wall 12, multiple compartments 13 and multiple locking buttons 14. The first wall 11 is one side wall of the body, the second wall 12 is opposite to the first wall 11. The compartments 13 are formed in the body 10 and located between the first wall 11 and the second wall 12.

The locking buttons 14 are mounted on the first wall 11 and corresponds to the compartments 13 in number and position, and each one of the locking buttons 14 comprises a connecting segment 141 and a second convex block 142. The connecting segment 141 is located on the bottom of the locking button 14 and is connect to the first wall 11 of the body 10, such that a gap is located between the locking button 14 and the first wall 11. The second convex block 142 protrudes toward the compartment 13.

In this embodiment, multiple lids 20 are pivotably mounted on the second wall 12 of the body 10 and correspond to the compartments 13 in number and position. The lids 20 can each respectively and selectively close the corresponding compartment 13 and be embedded in the corresponding locking button 14. Each one of the lids 20 comprises an inner surface 21, a first convex block 22 and a locking loop 23. Each one of the lids 20 can be opened and closed separately. The first convex block 22 is mounted to the lid 20 on one end of the lid near the second wall. The locking loop 23 is mounted on the inner surface 21 of the lid 20 and is selectively embedded in the second convex block 142 in the gap between the locking button 14 and the first wall 11.

The inner surface 21 of the lid 20 is facing the corresponding compartment 13. When the lid 20 is closed, the lid 20 closes the corresponding compartment 13, and is embedded in the corresponding locking button 14. When the lid 20 is opened, the lid 20 opens the corresponding compartment 13.

In this embodiment, multiple elastic assemblies 30 are mounted on the second wall 12 of the body 10 and correspond to the compartments 13 in number and position. The elastic assembly 30 is configured to push the corresponding lid open. Each one of the elastic assemblies 30 comprises a first segment 31, a second segment 32, a flexural segment 33, a first protruding section 34, a second protruding section 35, and a hole 36. The first segment 31 is bonding to the second wall 12 of the body 10. The second segment 32 is located on the elastic assembly 30 and is located at the opposite end to the first segment 31. The second segment 32 is a free end and can abut the inner surface 21 of the lid 20. The flexural segment 33 is located between the first segment 31 and the second segment 32. The first protruding section 34 is located on one side of the flexural segment 33 and can selectively contact the second wall 12. The second protruding section 35 is located on the other side of the flexural segment 33 and comprises a bottom surface 351. The bottom surface 351 of the second protruding section 35 is one surface of the second protruding 35 facing bottom of the body when the flexural segment 33 is straightened and the bottom surface 351 of the second protruding section 35 abuts the first convex block 22. The hole of the elastic assembly 30 is formed on the first segment 31. When the lid 20 is opened, the first protruding section 34 and the second protruding section 35 of the elastic assembly 30 is tilted downwardly protruding from the flexural segment 33.

The side covers 40 are connected to the second wall 12 of the body 10 and correspond to the at least one compartment 13 in number and position. Each one of the side covers 40 comprises a column 41. The column 41 protrudes toward the second wall 12 of the body 10 and is mounted through the hole 36 of the elastic assembly 30. Therefore, the first segment 31 of the elastic assembly 30 is securely mounted on the second wall 12.

Figure 6:
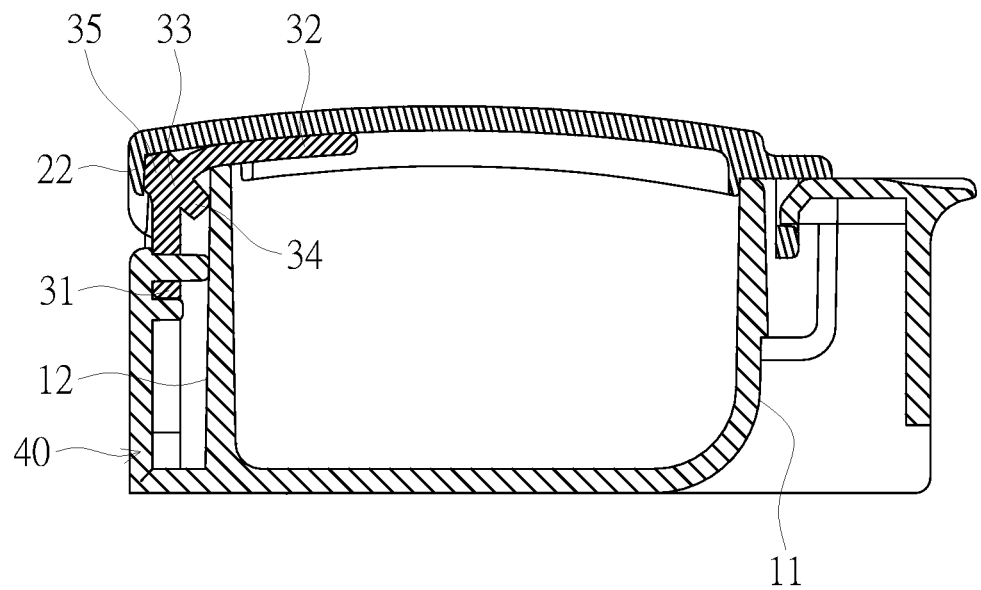
FIG. 6 is a cross-sectional side view of the lid of the pill container in FIG. 1, showing one lid being closed.
Figure 7:
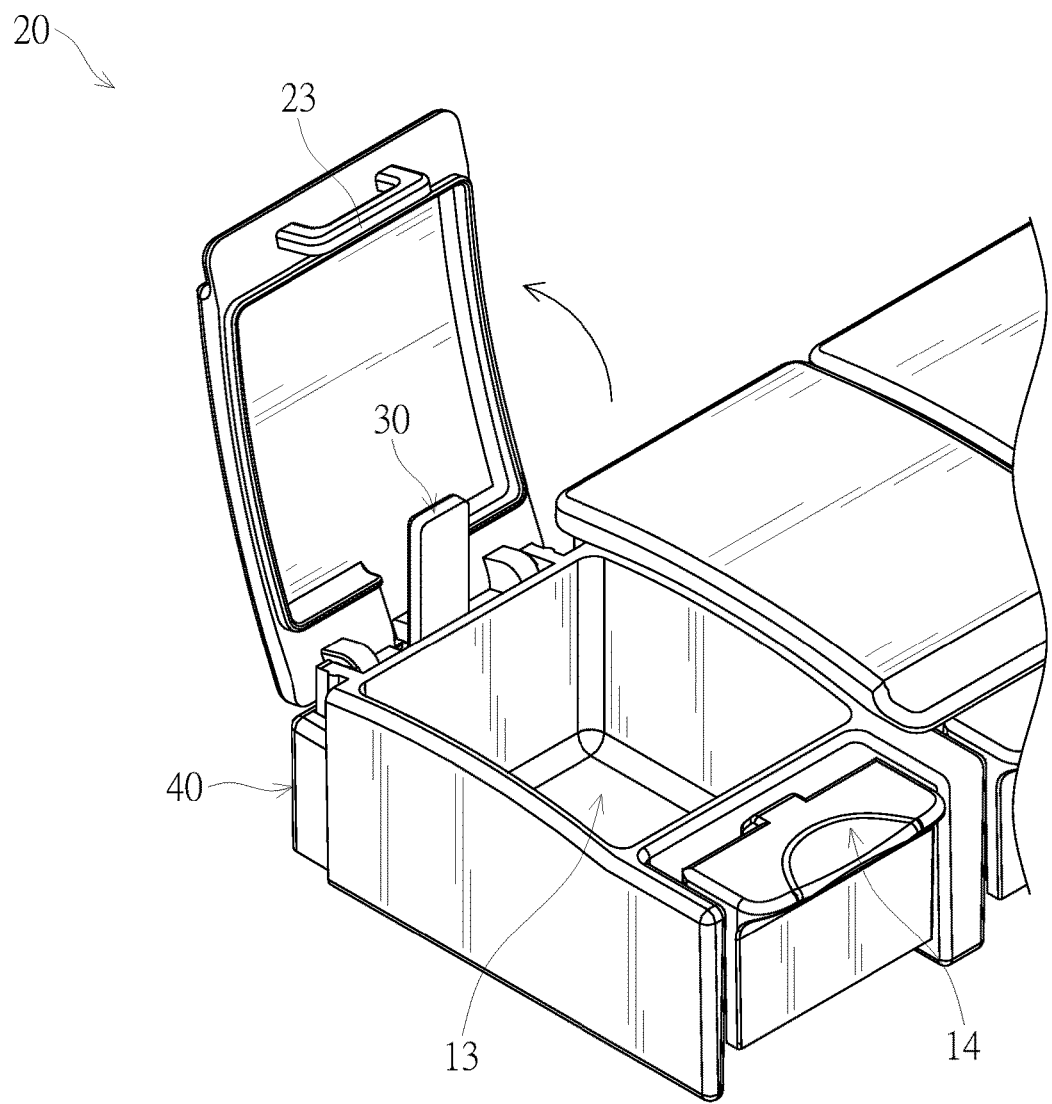
FIG. 7 is an enlarged operational cross-sectional side view of the pill container in FIG. 1.

When the lid 20 is closed (as shown in FIG. 6), the second protruding section 35 is pushed by the first convex block 22 of the lid 20. The second protruding section 35 leads the flexural segment 33 of the elastic assembly 30 to bend and finally the second convex block 142 of the locking button 14 is embedded in the locking loop 23 of the lid 20. Meanwhile, the flexural segment 33 of the elastic assembly 30 is in a curved state, and there is a space between the first segment 31 and the compartment 13 due to the first protruding section 34. Therefore, the bending state of the flexural segment 33 is smoother and does not present a large angle bend.

Figure 5:
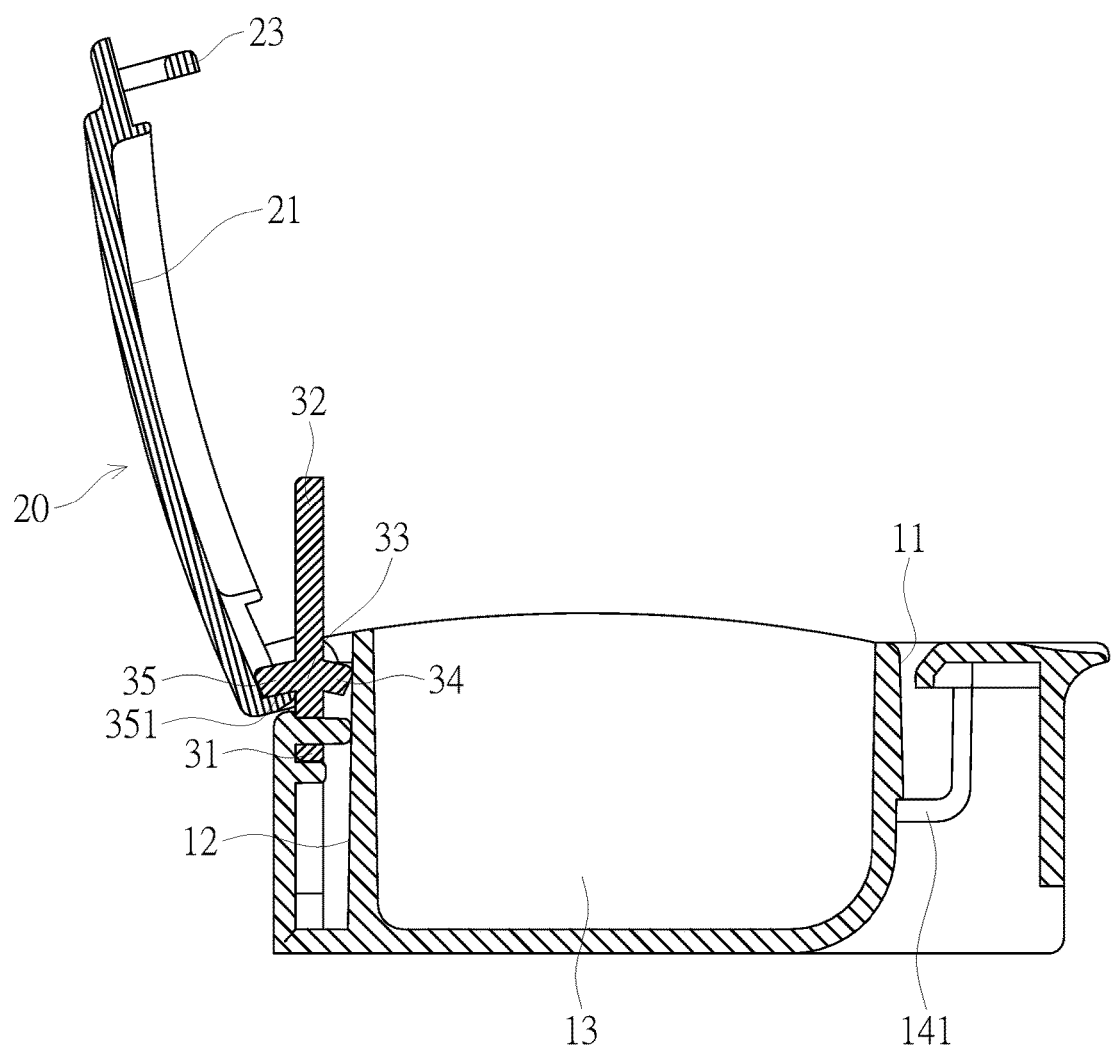
FIG. 5 is a cross-sectional side view of a lid of the pill container in FIG. 1, showing one lid being opened.

When the lid 20 is opened (as shown in FIG. 5), the user first presses the locking button 14 to separate the second convex block 142 of the locking button 14 from the locking loop 23 of the lid 20. The flexural segment 33 of the elastic assembly 30 is no longer restricted by the lid 20 and drives the second section 32 of the elastic assembly 30 to push and open the lid 20. The second protruding section 35 moves along with the elastic assembly 30 and pushes the first convex block 22 to rotate, so as to assist the lid 20 in opening.

The advantage of the present invention over the the conventional pill container is by adding the first protruding section 34 and the second protruding section 35 to the elastic assembly 30. The first protruding section 34 supports a space between the flexural segment 33 of the elastic assembly 30 and the body 10 so that the flexural segment 33 can have more space to bend without presenting a folded corner due to direct contact with the second wall 12 of the body 10. Therefore, the elastic assembly 30 is less prone to elastic fatigue and can be used for a longer period of time, and allows the lid 20 to remain open at a large angle. Meanwhile, the second protruding section 35 abuts the first convex block 22 of the lid 20, and when the lid 20 is closed, the second protruding section 35 will be pushed by the first convex block 22, which in turn will lead the elastic assembly 30 to bend. While the lid 20 is being opened, the second protruding section 35 can drive the first convex block 22 to rotate and thereby assist the lid 20 in opening. In this way, the elastic assembly 30 is less susceptible to elastic fatigue and can be used for a longer period of time, and the lid 20 can be driven to maintain a large opening angle.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A pill container comprising:
    a body comprising:
    a first wall being one side wall of the body;
    a second wall opposite the first wall;
    at least one compartment formed in the body and located between the first wall and the second wall;
    at least one locking button mounted on the first wall and corresponding to the at least one compartment in number and position;
    at least one lid pivotably mounted on the second wall of the body, corresponding to the at least one compartment in number and position; each one of the at least one lid respectively and selectively closing the at least one compartment and embedded in the at least one locking button, and each one of the at least one lid comprising:
    an inner surface facing the compartment;
    at least one elastic assembly bonded to the second wall of the body and corresponding to the at least one compartment in number and position, and respectively configured to push the at least one lid to open, and each one of the at least one elastic assembly comprising:
    a first segment bonded to the second wall of the body;
    a second segment located opposite to the first segment; the second segment abutting the inner surface of the lid when the lid is closed;

a flexural segment located between the first segment and the second segment and the flexural segment being capable of being bent or straightened;

a first protruding section protruding from one side of the flexural segment toward the second wall and selectively contacting the second wall, wherein when the lid is closed, the first protruding section abuts the second wall of the body.

2. The pill container as claimed in claim 1, wherein each one of the at least one lid comprises a first convex block mounted on one end of the lid near the second wall.

3. The pill container as claimed in claim 1, wherein each one of the at least one elastic assembly comprises a second protruding section located on the flexural segment.

4. The pill container as claimed in claim 2, wherein each one of the at least one elastic assembly comprises a second protruding section located on the flexural segment.

5. The pill container as claimed in claim 3, wherein, each second protruding section comprises:

a bottom surface being one surface of the second protruding section facing bottom of the body when the flexural segment is straightened and the bottom surface abuts the first convex block.

6. The pill container as claimed in claim 4, wherein, each second protruding section comprises:

a bottom surface being one surface of the second protruding section facing bottom of the body when the flexural segment is straightened and the bottom surface abuts the first convex block.

7. The pill container as claimed in claim 1, wherein, each one of the at least one elastic assembly comprises a hole formed on the first segment;

the body comprises at least one side cover connected to the second wall of the body and corresponding to the at least one compartment in number and position, and each one of the at least one side cover comprising:

a column protruding toward the second wall of the body and mounted through the hole of the elastic assembly.

8. The pill container as claimed in claim 6, wherein, each one of the at least one elastic assembly comprises a hole formed on the first segment;

the body comprises at least one side cover connected to the second wall of the body and corresponding to the at least one compartment in number and position, and each one of the at least one side cover comprising:

a column protruding toward the second wall of the body and mounted through the hole of the elastic assembly.

9. The pill container as claimed in claim 1, wherein, when any of the at least one lid is opened, the first protruding section of the elastic assembly corresponding to the lid that is opened is tilted downwardly and protruding from the flexural segment.

10. The pill container as claimed in claim 8, wherein, when any of the at least one lid is opened, the first protruding section of the elastic assembly corresponding to the lid that is opened is tilted downwardly and protruding from the flexural segment.

11. The pill container as claimed in claim 3, wherein, when any of the at least one lid is opened, the first protruding section of the elastic assembly corresponding to the lid that is opened is protruding from the flexural segment and tilted downwardly; and when any of the at least one lid is opened, the second protruding section of the elastic assembly corresponding to the lid that is opened is protruding from the flexural segment and tilted downwardly.

12. The pill container as claimed in claim 10, wherein, when any of the at least one lid is opened, the second protruding section of the elastic assembly corresponding to the lid that is opened is protruding from the flexural segment and tilted downwardly.

* * * * *